(12) United States Patent
Ikeda et al.

(10) Patent No.: US 7,510,994 B2
(45) Date of Patent: Mar. 31, 2009

(54) CATALYST FOR FISCHER-TROPSCH SYNTHESIS AND PROCESS FOR PRODUCING HYDROCARBONS

(75) Inventors: Masakazu Ikeda, Yokohama (JP); Toshio Waku, Yokohama (JP); Nobuo Aoki, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 114 days.

(21) Appl. No.: 11/538,139

(22) Filed: Oct. 3, 2006

(65) Prior Publication Data

US 2007/0105963 A1 May 10, 2007

Related U.S. Application Data

(63) Continuation of application No. PCT/JP2005/007743, filed on Apr. 18, 2005.

(30) Foreign Application Priority Data

Apr. 16, 2004 (JP) ............................. 2004-122161

(51) Int. Cl.
  *B01J 23/00* (2006.01)
  *B01J 21/00* (2006.01)
  *B01J 20/00* (2006.01)
(52) U.S. Cl. .................. 502/327; 502/242; 502/259; 502/260; 502/261; 502/263; 502/332; 502/335; 502/337; 502/349; 502/350; 502/351; 502/355; 502/415; 502/439; 502/527.13
(58) Field of Classification Search ................. 502/242, 502/259, 260, 261, 262, 263, 326, 327, 332, 502/335, 337, 349, 350, 351, 355, 407, 415, 502/439, 527.13
See application file for complete search history.

(56) References Cited

U.S. PATENT DOCUMENTS

| | | | | |
|---|---|---|---|---|
| 2,921,035 A * | 1/1960 | Houdry | ....................... | 502/355 |
| 2,943,066 A * | 6/1960 | Foster et al. | ................ | 502/351 |
| 2,965,588 A * | 12/1960 | Spencer | ....................... | 524/538 |
| 3,271,322 A * | 9/1966 | Stiles | ........................ | 502/159 |
| 3,498,927 A * | 3/1970 | Stiles | ........................ | 502/237 |
| 3,840,471 A * | 10/1974 | Acres | ........................ | 502/177 |
| 4,157,316 A * | 6/1979 | Thompson et al. | .......... | 502/304 |
| 4,346,131 A * | 8/1982 | Yoldas | ....................... | 428/34.7 |
| 4,438,219 A * | 3/1984 | Brandenburg et al. | ....... | 502/333 |
| 4,499,209 A | 2/1985 | Hoek et al. | | |
| 4,918,042 A * | 4/1990 | Takada et al. | ............... | 502/314 |
| 4,977,126 A * | 12/1990 | Mauldin et al. | ............. | 502/242 |
| 4,992,406 A * | 2/1991 | Mauldin et al. | ............. | 502/304 |
| 5,021,387 A * | 6/1991 | Reinalda et al. | ............. | 502/260 |
| 5,229,345 A * | 7/1993 | Logothetis et al. | .......... | 502/242 |
| 6,235,677 B1 * | 5/2001 | Manzer et al. | .............. | 502/232 |
| 6,353,035 B2 * | 3/2002 | Manzer et al. | .............. | 518/700 |
| 6,777,374 B2 * | 8/2004 | Sahle-Demessie et al. | .. | 502/350 |
| 2002/0012779 A1 * | 1/2002 | Miyashita et al. | ........... | 428/216 |
| 2002/0029955 A1 * | 3/2002 | Sahle-Demessie et al. | ..................... | 204/157.15 |
| 2002/0052289 A1 * | 5/2002 | Manzer et al. | ................ | 502/66 |
| 2003/0013607 A1 * | 1/2003 | Morikawa et al. | ............ | 502/200 |
| 2003/0096701 A1 * | 5/2003 | Fujishima et al. | ............ | 502/350 |
| 2004/0115443 A1 * | 6/2004 | Bond et al. | .................. | 428/432 |
| 2004/0166056 A1 * | 8/2004 | Eyman et al. | ................ | 423/652 |
| 2004/0166340 A1 * | 8/2004 | Cairns et al. | ................. | 428/472 |
| 2004/0198592 A1 * | 10/2004 | Hu et al. | ...................... | 502/304 |
| 2005/0069639 A1 * | 3/2005 | Ogata et al. | ................. | 427/180 |
| 2005/0233899 A1 * | 10/2005 | Anzaki et al. | ............... | 502/350 |
| 2005/0266160 A1 * | 12/2005 | Bond et al. | .................. | 427/164 |
| 2006/0019104 A1 * | 1/2006 | Hurst et al. | .................. | 428/428 |

FOREIGN PATENT DOCUMENTS

| | | |
|---|---|---|
| EP | 0 455 307 A1 | 11/1991 |
| JP | 59-102440 A | 6/1984 |
| JP | 04-227847 A1 | 8/1992 |
| JP | 10-85614 A | 4/1998 |

OTHER PUBLICATIONS

Bunjerd Jongsomjit, et al., "Effect of zirconia-modified alumina on the properties of CO/γ-Al2O3 catalysts", Journal Of Catalysis 215, pp. 66-77 (2003).
Masakazu Ikeda, et al., "Development of novel FT synthesis catalyst—study of a novel method for loading zirconia-", Annual Meeting Report of Japan Petroleum Institute, vol. 47, p. 105 (2004).
Masakazu Ikeda, et al., "Development of novel FT synthesis catalyst (vol. 2)—improvement in a method of loading zirconia film-", Report of Petroleum and Petroleum Chemistry Discussion, vol. 34, p. 264 (2004).

* cited by examiner

*Primary Examiner*—Cam N. Nguyen
(74) *Attorney, Agent, or Firm*—Panitch Schwarze Belisario & Nadel LLP

(57) ABSTRACT

A catalyst is provided which is low in methane selectivity in a high CO conversion region and high in chain growth probability α in a Fischer-Tropsch synthesis and comprises a support comprising silica or alumina and an oxide of zirconium and/or titanium loaded thereon in film form in an amount ranging from 0.5 percent by mass to 10.0 percent in terms of metal, and one or more metals selected from the group consisting of cobalt, nickel and ruthenium loaded on the support.

4 Claims, No Drawings

CATALYST FOR FISCHER-TROPSCH SYNTHESIS AND PROCESS FOR PRODUCING HYDROCARBONS

CROSS-REFERENCE TO RELATED APPLICATIONS

This application is a continuation of International Application No. PCT/JP2005/007743 filed Apr. 18, 2005, which was published in the Japanese Language on Oct. 27, 2005, under International Publication No. WO 2005/099897A1, and the disclosure of which in incorporated herein by reference.

BACKGROUND OF THE INVENTION

The present invention relates to a catalyst for synthesizing hydrocarbons from a synthesis gas containing hydrogen and carbon monoxide as main components and a process for producing hydrocarbons using such a catalyst.

Reactions for synthesizing hydrocarbons from a synthesis gas containing hydrogen and carbon monoxide as main components are referred to as "Fischer-Tropsch synthesis (FT synthesis)" and are well-known in the related art. Fischer-Tropsch synthesis is carried out using catalysts obtained by loading an active metal such as iron or cobalt on a support such as silica or alumina (for example, see Patent Document 1 below).

It is reported that these catalysts are improved in carbon monoxide conversion (CO conversion) by the use of other metals (hereinafter referred to as "second metal") in combination with such an active metal (for example, see Patent Document 2 below).

(1) Patent Document 1: Japanese Patent Laid-Open Publication No. 4-227847

(2) Patent Document 1: Japanese Patent Laid-Open Publication No. 59-102440

The FT synthesis reaction is defined by indexes such as CO conversion, methane selectivity, and chain growth probability $\alpha$. A lower methane selectivity means that methane-generating reaction, i.e., a side reaction of the Fischer-Tropsch reaction, is suppressed low. The chain growth probability $\alpha$ is used as a measure of the molecular weights of the resulting hydrocarbons, and a higher chain growth probability a, i.e., close to 1.0 means that higher molecular weight hydrocarbons can be produced.

FT synthesis products are usually hydrocracked in the subsequent stages and then manufactured as clean liquid fuels. In recent years, among such liquid fuels, middle distillates such as kerosene and light gas oil are particularly in higher demand. In order to enhance the yield of these middle distillates, lower methane selectivity and higher chain growth probability $\alpha$ are required. Therefore, development of FT synthesis reactions of higher CO conversion, lower methane selectivity and higher $\alpha$ is held up a target in the industry and has been promoted by improving FT synthesis catalysts.

However, it is generally known that the CO conversion and chain growth probability $\alpha$ tend to be in a trade-off relation. When the reaction temperature is raised, the CO conversion increases but the chain growth probability $\alpha$ decreases. When the reaction temperature is lowered, the chain growth probability $\alpha$ increases but the CO conversion decreases. More specifically, a catalyst with a high chain growth probability $\alpha$ in a high CO conversion region has not been developed yet. This is the biggest obstacle in utilizing FT synthesis and a process for producing clean liquid fuels using the synthesis practically. For example, it is disclosed in Patent Document 2 hat CO conversion can be increased by loading a second metal such as zirconium or titanium on silica. However, in the case where a second metal is added in a large amount of, for example, 20 percent by mass by a conventional impregnating method, it causes harmful effects that pores of the silica support are plugged and thus the surface area thereof is decreased, resulting in the decrease of the chain growth probability.

BRIEF SUMMARY OF THE INVENTION

The present invention has an object to provide a novel FT synthesis catalyst with a high chain growth probability $\alpha$ in a high CO conversion region so as to eliminate the obstacles to the practical use of the FT synthesis.

As a result of an extensive research made by the present inventors, they accomplished the present invention on the basis of the finding that the above-described problems were able to be overcome by loading an active metal on a support comprising silica or alumina and the oxide of zirconium and/or titanium loaded thereon in film form in an optimum amount.

That is, the present invention relates to a catalyst for Fischer-Tropsch synthesis which comprises a support comprising silica or alumina and an oxide of zirconium and/or titanium loaded thereon in film form in an amount ranging from 0.5 percent by mass to 10.0 percent by mass in terms of metal, and one or more metals selected from the group consisting of cobalt, nickel and ruthenium loaded on the support.

The present invention also relates to the above-described catalyst produced by loading a precursor compound of a metal selected from the group consisting of cobalt, nickel and ruthenium on the support, followed by drying and calcination.

Furthermore, the present invention also relates to the above-described catalyst loading two or more of the precursor compounds.

Furthermore, the present invention also relates to a process for producing hydrocarbons wherein the hydrocarbons are synthesized by reacting hydrogen with carbon monoxide using the foregoing catalyst.

DETAILED DESCRIPTION OF THE INVENTION

The present invention will be described in more detail below.

The support used in the present invention is that loading an oxide of titanium and/or zirconium in film form on silica or alumina. Examples of silica or alumina include inorganic compounds containing silica or alumina as the major component.

The specific surface area of silica or alumina used in the present invention is preferably from 100 to 500 m$^2$/g and more preferably from 200 to 400 m$^2$/g. When the specific surface area is smaller than 100 m$^2$/g, an active metal such as cobalt may aggregate. When the specific surface area is larger than 500 m$^2$/g, the pore diameter becomes smaller and thus may be plugged due to the loading of an active metal such as cobalt. The term "specific surface area" denotes the value measured by a nitrogen adsorbing method.

The average pore diameter of silica or alumina used in the present invention is preferably from 8 to 20 nm, more preferably from 10 to 18 nm and further more preferably from 11 to 16 nm. When the average pore diameter is smaller than 8 nm, the reaction activity would be reduced due to the diffusion limitation. When the average pore diameter is larger than 20 nm, the reaction activity may be reduced because the surface area of the support becomes smaller and thus the loaded metal aggregates. The term "average pore diameter" denotes the value measured by a nitrogen adsorbing method.

No particular limitation is imposed on the shape of silica or alumina used in the present invention. Therefore, silica or alumina may be in any shape suitable for the intended processes, selected from various shaped products such as spherical or pulverized products and column-like molded products. No particular limitation is imposed on the average particle diameter of silica or alumina. Any of those having an average particle size of generally from 10 µm to 10 mm and preferably 50 µm to 5 mm may be selected depending on the intended processes.

The loading amount of zirconium and/or titanium is from 0.5 percent by mass to 10.0 percent by mass, preferably from 1.0 percent by mass to 9.0 percent by mass and more preferably from 2.0 percent by mass to 8.0 percent by mass in terms of zirconium metal and/or titanium metal based on silica or alumina.

When the loading amount of zirconium and/or titanium based on silica or alumina is less than 0.5 percent by mass, the CO conversion improving effect could not be obtained. When the loading amount is more than 10.0 percent by mass, the chain growth probability would be decreased.

The term "loading in film form" denotes a state that no titanium and/or zirconium aggregates on the surface of silica or alumina and a single layer of the oxide of titanium and/or zirconium is substantially uniformly loaded on the surface of silica or alumina.

More specifically, the loading in film form is that expressed by Z (film index)>0.1 when $Z=((B1/A1)\times(B2/A2)^2)^R \times (Y/X)$ wherein
(1) A1=the specific surface area of silica or alumina (m$^2$/g);
(2) A2=the average pore diameter of silica or alumina (nm);
(3) B1=the specific surface area of silica or alumina loading the oxide of Zirconium and/or titanium (m$^2$/g);
(4) B2=the average pore diameter of silica or alumina loading the oxide of zirconium and/or titanium (nm);
(5) $X=A1\times4.74\times10-2$;
(6) Y=the mass percent of loaded zirconium×1.35+the mass percent of loaded titanium×1.67; and
(7) R=1 if Y/(X−Y)☐1 or R=Y/(X−Y) if Y/(X−Y)>1.
Preferably, Z☐0.12, and more preferably Z☐0.15.

Specific examples of the method for loading the oxide of titanium and/or zirconium in film form include that wherein after bubbles are removed from the pores of silica or alumina, it is impregnated with an aqueous solution containing compounds which will be zirconium and/or titanium sources while the impregnating time, solution concentration, impregnating temperature and pH are adjusted and hydrolysis rate is controlled such that the decrease of the surface area of silica or alumina is held down to 5 percent or less, preferably 4 percent or less and more preferably 3 percent or less and the decrease of the average pore diameter is held down to 25 percent or less, preferably 23 percent or less and more preferably 20 percent or less. Bubbles may be removed from the pores of silica or alumina preferably by irradiating thereto an ultrasonic wave after the silica or alumina is soaked in distilled water or by soaking silica or alumina in distilled water or an aqueous solution under vacuum.

Compounds which will be a zirconium source are preferably zirconyl chloride ($ZrOCl_2$), zirconyl chloride hydroxide (ZrO(OH)Cl), zirconyl sulfate ($ZrOSO_4$), zirconyl acetate ($ZrO(C_2H_3O_2)_2$) and ammonium zirconyl carbonate ($(NH_4)_2ZrO(CO_3)_2$), and more preferably zirconyl acetate and ammonium zirconyl carbonate. Compounds which will be a titanium source are preferably titanium fluoride ($TiF_4$), titanyl sulfate ($TiOSO_4$) and ammonium hexafluorotitanate ($(NH_4)_2TiF_6$).

In the present invention, both of a high CO conversion and a high chain growth probability can be maintained by restraining the specific surface and average pore diameter of the support from decreasing due to the loading of zirconium and/or titanium, by loading zirconium and/or titanium in film form in an amount ranging from 0.5 percent by mass to 10.0 percent by mass based on silica or alumina so as to avoid the plugging of the pores as well as by increasing the contact surfaces between an active metal such as cobalt and zirconium and/or titanium due to the loading thereof in film form.

In the present invention, an alkali or alkaline earth metal may be included in a support obtained by loading the oxide of zirconium and/or titanium in film form on silica or alumina. It is expected that the chain growth probability can be improved by including an alkali or alkaline earth metal. The amount of an alkali or alkaline earth metal to be included is preferably from 0.03 percent by mass to 0.3 percent by mass based on the support. When the amount of an alkali or alkaline earth metal is less than 0.03 percent by mass, the chain growth probability improving effect by modification may not be exhibited. When the amount of an alkali or alkaline earth metal is more than 0.3 percent by mass, the CO conversion may be decreased.

The Fischer-Tropsch synthesis catalyst of the present invention comprises an active metal loaded on the above-described support obtained by loading the oxide of zirconium and/or titanium in film form on silica or alumina.

The active metal to be loaded on the support is selected from the group consisting of cobalt, nickel and ruthenium, among which more preferred are cobalt and ruthenium and most preferred is cobalt. The active metal is generally loaded in the form of a metal oxide on the support by dipping the support into a solution containing one or more precursor compounds containing the metal such that the compounds are impregnated onto and loaded on the support, followed by drying and calcination.

Eligible precursor compounds containing a metal selected from the group consisting of cobalt, nickel and ruthenium are all compounds containing in their molecules such a metal in the form of a salt or a complex. Although no particular limitation is imposed on the type of the compound, preferred are nitrate, hydrochloride, sulfate, formate, acetate, propionate, oxalate, and acetylacetnate. In the present invention, two or more types of the precursor compounds in combination are also preferably used. In such a case, no particular limitation is imposed on the combination. Preferred combinations are nitrate and formate; nitrate and acetate; and nitrate and acetylacetnate. Particularly preferred combinations are nitrate and formate; and nitrate and acetate. Most preferred combination is nitrate and acetate.

No particular limitation is imposed on the drying method which, therefore, may be natural dry in the air and deaeration dry under vacuum. Drying may be generally carried out at a temperature of 100 to 200° C. and preferably of 110 to 150° C. for 0.5 to 48 hours, preferably 5 to 24 hours under the air atmosphere. No particular limitation is imposed on the calcination method which, therefore, may be generally carried out at a temperature of 300 to 600° C. and preferably of 400 to 450° C. for 0.5 to 10 hours and preferably 1 to 5 hours under the air atmosphere.

No particular limitation is imposed on the loading amount of the active metal. However, the active metal is loaded in an amount of generally 3 to 50 percent by mass, preferably 5 to 40 percent by mass, and particularly preferably 10 to 30 percent by mass in terms of metal based on the support. When the active metal is loaded in an amount of less than 3 percent by mass, the resulting catalyst would be poor in activity. When the active metal loaded in an amount of more than 50 percent by mass, it would be extremely aggregated and thus the advantageous effects of the present invention may not be exhibited sufficiently.

When the catalyst of the present invention is used for an FT synthesis reaction, it is preferably reduced with hydrogen beforehand.

No particular limitation is imposed on feed stocks for an FT synthesis reaction conducted using the catalyst of the present invention as long as they are synthesis gases containing hydrogen and carbon monoxide as main components. However, the molar ratio of hydrogen to carbon monoxide is from 1.5 to 2.5 and preferably from 1.8 to 2.2.

The catalyst of the present invention is applicable to any process known as reaction processes for FT synthesis, such as fixed bed-, supercritical fixed bed-, slurry bed-, and fluidized bed-type reaction processes. Although not restricted, preferred processes are fixed bed-, supercritical fixed bed-, and slurry bed-type reaction processes.

No particular limitation is imposed on the reaction conditions of an FT synthesis reaction which, therefore, may be carried out under conditions which have conventionally been employed. The reaction may be carried out at a temperature generally of 200 to 280° C. and gas hourly space velocity of 1000 to 3000 $h^{-1}$.

An FT-synthesis reaction whose methane selectivity in a high CO conversion region is low and chain growth probability α is high can be accomplished using the catalyst of the present invention.

The present invention will be described in more detail with reference to the following examples and comparative examples but are not limited thereto.

EXAMPLE 1

10 g of silica with an average pore diameter of 13.0 nm and a specific surface area of 325 $m^2/g$ were weighed into a tube equipped with a screw, and 80 ml of distilled water were added thereto. A one-hour ultrasonic wave irradiation was conducted. Thereafter, sucking of the distilled water was done with a dropping pipette, followed by addition of 80 ml of an aqueous solution containing ammonium zirconyl carbonate at a concentration of 0.1 mol/L. After a one-minute ultrasonic wave irradiation, the tube was allowed to stand at room temperature for one day. The content of the tube was filtered with a filter paper, washed with 250 ml of distilled water, dried at a temperature of 120° C. overnight, and calcined at a temperature of 500° C. for one hour. The zirconium metal content of the resulting support was analyzed using a metal analyzer and was found to be 2.0 percent by mass based on the silica. The average pore diameter and specific surface area of the support was measured by nitrogen adsorption and found to be 12.6 nm and 317 $m^2/g$, respectively.

Thereafter, the support was impregnated with an aqueous solution containing cobalt nitrate in an amount of 10.0 percent by mass in terms of cobalt and cobalt acetate in an amount of 10.0 percent by mass in terms of cobalt, based on the silica by Incipient Wetness method. After the impregnation, the support was dried at a temperature of 120° C. overnight and then calcined at a temperature of 450° C. for 2 hours thereby obtaining a catalyst. The catalyst was charged into a fixed-bed circulation-type reactor and reduced under a hydrogen gas stream at a temperature of 400° C. for 2 hours before a reaction was initiated. Thereafter, a feed stock mixed gas containing hydrogen and carbon monoxide at a molar ratio of 2/1 was supplied at a gas hourly space velocity of 2000 $h^{-1}$, and the reaction was initiated at a temperature of 220° C. and a pressure of one MPa. The gas composition at the outlet of the reactor was analyzed using a gas chromatography with time. The CO conversion, methane selectivity, and chain growth probability α were calculated using the resulting analyzed data in accordance with a conventional method. The results are set forth in Table 1.

EXAMPLE 2

Example 1 was repeated except that an aqueous solution containing ammonium zirconyl carbonate at a concentration of 1.0 mol/L was used instead of an aqueous solution containing ammonium zirconyl carbonate at a concentration of 0.1 mol/L.

The loading amount of zirconium metal of the resulting support was 8.0 percent by mass based on the silica. The average pore diameter and specific surface area of the support were 10.2 nm and 309 $m^2/g$, respectively.

The CO conversion, methane selectivity, and chain growth probability α were calculated in the same manner as Example 1. The results are set forth in Table 1.

COMPARATIVE EXAMPLE 1

10 g of silica with an average pore diameter of 13.0 nm and a specific surface area of 325 $m^2/g$ were impregnated with an aqueous solution containing zirconyl nitrate in an amount of 2.0 percent by mass in terms of zirconium by Incipient Wetness method. After the impregnation, the support was dried at a temperature of 120° C. overnight and then calcined at a temperature of 450° C. for 2 hours. The average pore diameter and specific surface area of the resulting support were measured by nitrogen adsorption and found to be 9.0 nm and 300 $m^2/g$, respectively. There was observed aggregation wherein the zirconium was cross-linked by oxygen atoms.

Thereafter, the support was impregnated with an aqueous solution containing cobalt nitrate in an amount of 10.0 percent by mass in terms of cobalt and cobalt acetate in an amount of 10.0 percent by mass in terms of cobalt, based on the silica by Incipient Wetness method. After the impregnation, the support was dried at a temperature of 120° C. overnight and then calcined at a temperature of 450° C. for 2 hours thereby obtaining a catalyst. The catalyst was charged into a fixed-bed circulation-type reactor and reduced under a hydrogen gas stream at a temperature of 400° C. for 2 hours before a reaction was initiated. Thereafter, a feed stock mixed gas containing hydrogen and carbon monoxide at a molar ratio of 2/1 was supplied at a gas hourly space velocity of 2000 $h^{-1}$, and the reaction was initiated at a temperature of 250° C. and a pressure of one MPa. The gas composition at the outlet of the reactor was analyzed using a gas chromatography with time. The CO conversion, methane selectivity, and chain growth probability α were calculated using the resulting analyzed data in accordance with a conventional method. The results are set forth in Table 1.

COMPARATIVE EXAMPLE 2

Comparative Example 1 was repeated except that an aqueous solution containing zirconyl nitrate in an amount of 10.0 percent by mass in terms of zirconium was used.

The average pore diameter and specific surface area of the resulting support were 8.0 nm and 290 $m^2/g$, respectively. In this comparative example, there was observed aggregation wherein the zirconium was cross-linked by oxygen atoms, similarly to Comparative Example 1.

The CO conversion, methane selectivity, and chain growth probability α were calculated in the same manner as Comparative Example 1. The results are shown in Table 1.

It is apparent from Table 1 that a high CO conversion, low methane selectivity and high chain growth probability α are satisfied at all once with the Fischer-Tropsch synthesis catalysts of the present invention comprising a metal selected from the group consisting of cobalt, nickel and ruthenium loaded on a support obtained by loading on silica or alumina the oxide of zirconium and/or titanium in an amount ranging from 0.5 percent by mass to 10.0 percent by mass, in film form.

TABLE 1

|  | Example 1 | Example 2 | Comparative Example 1 | Comparative Example 2 |
|---|---|---|---|---|
| Zr content (mass %) | 2 | 8 | 2 | 10 |
| Reduction in Average Pore Diameter (%) | 3.1 | 21.5 | 10.8 | 38.5 |
| Reduction in Specific Surface Area (%) | 2.5 | 4.9 | 7.7 | 10.8 |
| CO Conversion (%) | 66 | 68 | 52 | 46 |
| Methane Selectivity (%) | 8.5 | 7.5 | 10.0 | 9.0 |
| Chain Growth Probability α | 0.92 | 0.92 | 0.90 | 0.88 |
| Z (Film Index) | 0.1605 | 0.1996 | 0.0775 | 0.0004 |

The invention claimed is:

1. A catalyst for Fischer-Tropsch synthesis, which comprises a support comprising silica or alumina, wherein an oxide of zirconium and/or titanium is loaded on the support in film form in an amount ranging from 0.5 percent by mass to 10.0 percent in terms of metal to provide a film index of greater than 0.1, and wherein one or more metals selected from the group consisting of cobalt, nickel and ruthenium is loaded on the support.

2. The catalyst according to claim 1, wherein the catalyst is produced by loading a precursor compound of a metal selected from the group consisting of cobalt, nickel and ruthenium to the support, followed by drying and calcining.

3. The catalyst according to claim 2, wherein two or more of said precursor compounds are loaded.

4. The catalyst according to claim 1, wherein the film index is expressed by the following formula:

$$Z = ((B1/A1) \times (B2/A2)^2)^R \times (Y/X)$$

wherein A1 is the specific surface area of silica or alumina ($m^2/g$);

A2 is the average pore diameter of silica or alumina (nm);

B1 is the specific surface area of the silica or alumina loading the oxide of zirconium and/or titanium ($m^2/g$);

B2 is the average pore diameter of the silica or alumina loading the oxide of zirconium and/or titanium (nm);

$X = A1 \ast (4.74 \times 10^{-2})$;

$Y =$ (the mass percent of loaded zirconium$\ast 1.35$)+(the mass percent of loaded titanium$\ast 1.67$); and $R = 1$ if $Y/(X-Y) \leqq 1$ or $R = Y/(X-Y)$ if $Y/(X-Y) > 1$.

\* \* \* \* \*